(12) United States Patent
Saeki et al.

(10) Patent No.: US 7,809,300 B2
(45) Date of Patent: Oct. 5, 2010

(54) IMAGE FORMING APPARATUS SHOWING PREVIEW OF FINISHING AS APPLIED TO SAMPLE IMAGE

(75) Inventors: Iwao Saeki, Kanagawa (JP); Tetsuya Sakayori, Tokyo (JP); Takashi Yano, Tokyo (JP); Junichi Takami, Kanagawa (JP); Yoshifumi Sakuramata, Tokyo (JP); Takanori Nagahara, Kanagawa (JP); Haruo Shida, Kanagawa (JP); Hiroko Mano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 126 days.

(21) Appl. No.: 11/640,062

(22) Filed: Dec. 14, 2006

(65) Prior Publication Data

US 2007/0140723 A1 Jun. 21, 2007

(30) Foreign Application Priority Data

Dec. 15, 2005 (JP) ............................. 2005-362188
Oct. 26, 2006 (JP) ............................. 2006-290891

(51) Int. Cl.
*G03G 15/00* (2006.01)
(52) U.S. Cl. ......................................... 399/82; 399/407
(58) Field of Classification Search ............. 399/81–82, 399/182–184, 407
See application file for complete search history.

(56) References Cited

U.S. PATENT DOCUMENTS

| 6,701,011 | B1 * | 3/2004 | Nakajima | 382/167 |
| 2004/0070619 | A1 * | 4/2004 | Yoshio et al. | 345/764 |
| 2007/0086073 | A1 * | 4/2007 | Horiuchi | 358/527 |
| 2007/0133073 | A1 * | 6/2007 | Shida et al. | 358/527 |
| 2007/0143671 | A1 * | 6/2007 | Paterson et al. | 715/527 |

FOREIGN PATENT DOCUMENTS

| JP | 2001-67347 | | 3/2001 |
| JP | 2003005471 | A * | 1/2003 |
| JP | 2006-3568 | | 1/2006 |

* cited by examiner

*Primary Examiner*—David M Gray
*Assistant Examiner*—Andrew V Do
(74) *Attorney, Agent, or Firm*—Cooper & Dunham LLP

(57) ABSTRACT

Sample image data are stored beforehand in a storage unit. A first generation unit generates temporary finishing information by making setting processing on the sample image data based on setting information, and a second generation unit generates input screen information including setting processing items to accept various setting inputs to the temporary finishing information. A display unit displays an input screen based on the temporary finishing information and the input screen information, and a setting output unit outputs setting information received via the input screen to the first generation unit. Finally, a copying processing unit executes copying processing with respect to the real image data based on the temporary finishing information.

15 Claims, 10 Drawing Sheets

IMAGE FORMING APPARATUS SHOWING PREVIEW OF FINISHING AS APPLIED TO SAMPLE IMAGE

CROSS-REFERENCE TO RELATED APPLICATIONS

The present document incorporates by reference the entire contents of Japanese priority documents, 2005-362188 filed in Japan on Dec. 15, 2005 and 2006-290891 filed in Japan on Oct. 26, 2006.

BACKGROUND

1. Technical Field

This disclosure relates to an electrostatic attraction device that attracts and transports recording media, such as paper, and an image forming apparatus, such as an inkjet recording apparatus, using the same.

2. Description of the Related Art

There has been known a scanner that reads out a document image, a copying machine that prints the document image read out by a scanner, a printer and a facsimile apparatus for printing image data inputted from outside, and a so-called Multi Function Peripheral (MFP) provided with these function.

In the MFP, a user can carry out settings relating to various functions including settings relating to image processing such as margin size and to finishing processing such as stamping, stapling, and punching.

However, in the conventional MFP, when copying is started after these finishing functions are set, a finished state cannot be checked till a printing result is obtained. For example, in the finishing state with a punched hole, even if the position of the punched hole and an output image overlap, the result cannot be known till the result is obtained by actual printing, which leads to a problem of erroneous copying and waste of paper.

To solve the problem, Japanese Patent Application Laid-Open No. 2001-67347 discloses an information processor that displays a preview image of the finished state after processing of various functions such as finishing are carried out for a pre-scanned document image prior to actual copy printing to enable change of printing setting as necessary.

When various functional settings are made on preview display of an operation unit of an MFP, and the preview image reflecting the setting is displayed and printed after check of the finished state, the following problem comes out, considering a processing load.

The first point is that processing can not be made unless the document is pre-scanned and image data is read prior to the actual copy printing. The second point is that read-out image data in the finished state obtained by applying processing by various functions such as finishing to the pre-scanned document image needs to be converted to an image for display (thumb-nail image or the like).

BRIEF SUMMARY

In an aspect of this disclosure, an image forming apparatus includes an input unit that receives input of real image data; a storage unit that stores therein sample image data; a first generation unit that generates temporary finishing information by making setting processing on the sample image data in the storage unit based on setting information; a second generation unit that generates input screen information including setting processing items to accept various setting inputs to the temporary finishing information; a display unit that displays an input screen based on the temporary finishing information and the input screen information; a setting output unit that outputs setting information received via the input screen to the first generation unit; and a copying processing unit that executes copying processing with respect to the real image data based on the temporary finishing information.

In another aspect of this disclosure, an image forming apparatus includes an input unit that receives input of real image data; a storage unit that stores therein sample image data in advance; a first generation unit that generates temporary finishing information by executing various setting processing on the sample image data in the storage unit prior to the input unit receiving the real image; a second generation unit that generates input screen information including setting processing items to accept various setting inputs to the temporary finishing information; a display unit that displays an input screen based on the temporary finishing information and the input screen information; a setting output unit that outputs setting information received via the input screen to the first generation unit; a third generation unit that generates finishing information reflecting the various settings made on the sample image data to the real image data after completion of the various settings to the sample image data; and a copying processing unit that executes copying processing with respect to the real image data based on the finishing information.

In still another aspect of this disclosure, an image forming apparatus includes an input unit that receives input of real image data; a storage unit that stores therein sample image data; a first generation unit that generates temporary finishing information by making various setting processing on the sample image data till the real image data becomes displayable; a second generation unit that generates input screen information including setting processing items to accept various setting inputs to the temporary finishing information; a display unit that displays an input screen based on the temporary finishing information and the input screen information; a setting output unit that outputs setting information received via the input screen to the first generation unit; a third generation unit that generates finishing information reflecting various settings made on the sample image data to the real image data when the real image data becomes displayable; and a copying processing unit that executes copying processing with respect to the real image data based on the finishing information.

The above and other aspects, features, advantages and technical and industrial significance of this invention will be better understood by reading the following detailed description of presently preferred embodiments of the invention, when considered in connection with the accompanying drawings.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below with reference to accompanying drawings.

A first embodiment of the present invention will be described based on FIGS. 1 to 8. This embodiment is an example that a so-called Multi Function Peripheral (MFP) is applied as an image forming apparatus in which a copying function, a facsimile (FAX) function, a printing function, a scanner function, a function to distribute input images (read-out document images by the scanner function or images inputted by a printer or FAX function) are combined.

Figure 1:
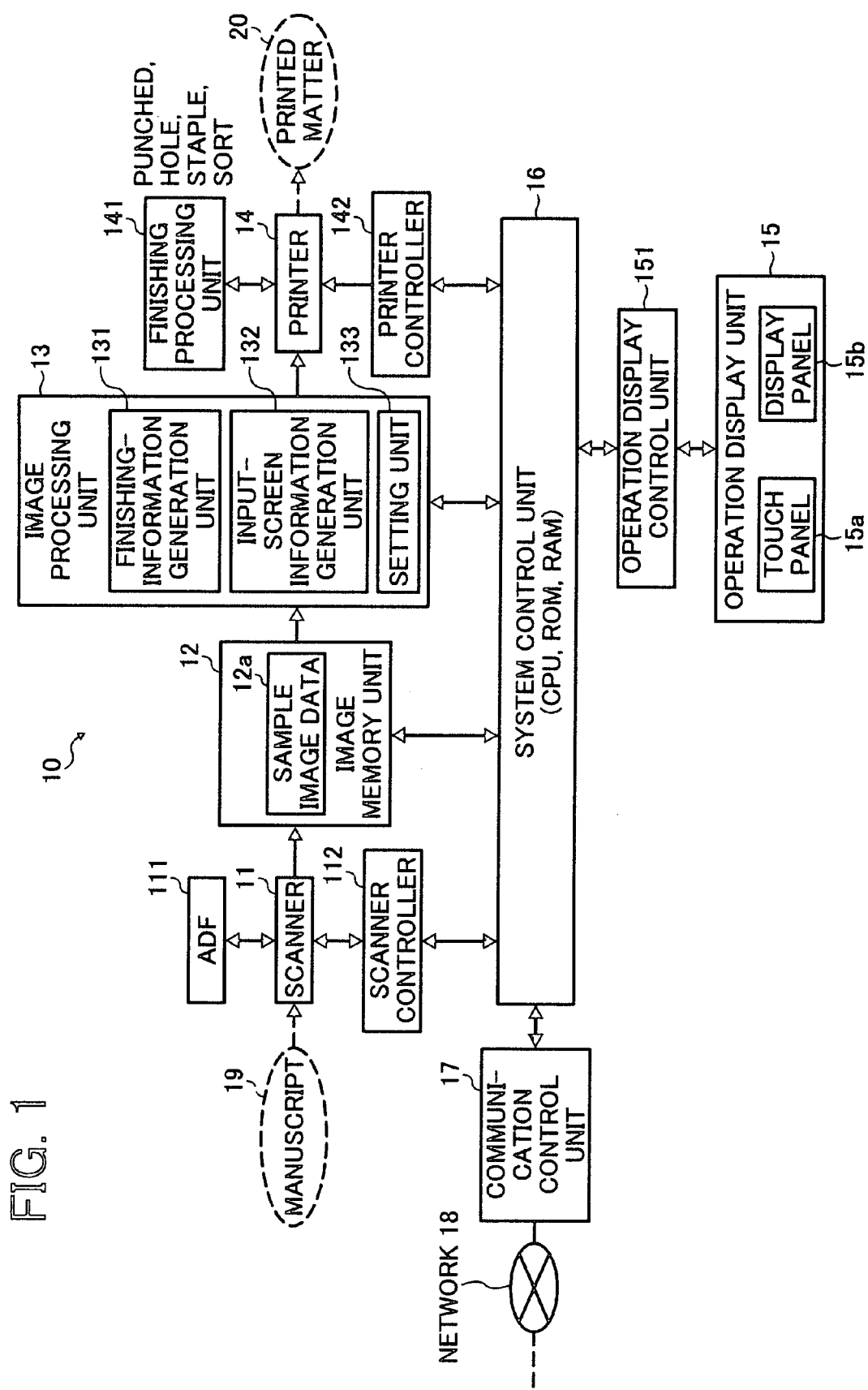
FIG. 1 is a functional block diagram of an MFP according to a first embodiment of the present invention.

FIG. 1 is a functional block diagram of an MFP 10 according to the first embodiment. The MFP 10 includes a scanner 11, an Auto Document Feeder (ADF) 111, a scanner controller 112, an image memory unit 12, an image processing unit 13, a printer 14, a printer controller 142, a finishing processing unit 141, an operation display unit 15, an operation display control unit 151, a system control unit 16, and a communication control unit 17. The MFP 10 is connected to a network 18 through the communication control unit 17. The MFP 10 reads out an image of a document 19, carries out image processing on the image, and outputs the processed image as a printed matter 20.

The system control unit 16 is connected to each constituent unit and executes control of the entire MFP 10. For example, the system control unit 16 carries out control such as supplying scanning area information appropriate for the selected paper size to the scanner 11. The system control unit 16 includes a Central Processing Unit (CPU), a Read Only Memory (ROM), a Random Access Memory (RAM) and the like (not shown). Various processing is executed by operation of the CPU based on a computer program stored in the ROM using a work area of the RAM.

The computer program executed by the MFP 10 can be offered in an installable or executable format file recorded in a computer-readable recording medium such as a CD-ROM, flexible disk (FD), CD-R, and Digital Versatile Disk (DVD). In this case, the CPU of the system control unit 16 reads out the program from the recording medium and loads it onto a main storage apparatus (not shown) so as to have various functions realized by the MFP 10. Alternatively, the computer program can be stored in the computer connected to the network 18 such as the Internet and provided by downloading through the network. Alternately, the computer program can be downloaded through the network such as the Internet.

The communication control unit 17 is connected to the network 18 such as a local area network (LAN) or the Internet and transacts image data, control data and the like with other equipment connected to the network according to a communication protocol.

The scanner controller 112 receives a command from the system control unit 16 and controls the scanner 11 based on the received command.

The scanner 11 converts the image of the document 19 to digital image data. In other words, the scanner 11 functions as an image data input unit. The ADF 111 feeds out a plurality of sheets of the set document, one by one, to a read-out position of the scanner 11. The scanner 11 one by one reads out an image of the document feed from the ADF 111. The ADF 111 can be configured to feed out a double-sided document, which is a document with printed matter on both sides, and the scanner 11 can be configured to read images of both sides of the double-sided document.

The image memory unit 12 is a buffer memory that receives a command of the system control unit 16 and temporarily stores image data and the like read out by the scanner 11 and image data received from outside through the network 18. The MFP 10 can process both the image data read from the scanner 11 provided at itself and the image data received from outside through the network 18 or the like and form images.

The image processing unit 13 receives a command from the system control unit 16, and in response to that command executes Y correction and/or MTF correction processing and the like with respect to multiple-value data that is received from the scanner 11 and temporarily stored in the image memory unit 12. Moreover, the image processing unit 13 performs binarization (or multiple-value) processing by tone processing such as slice processing and dither processing on the data. Furthermore, the image processing unit 13 carries out various image processing corresponding to the function set by a user (zoom, tone/color control and the like), image area editing processing (area deletion, area movement, area reversing and the like), layout processing (double-sided printing/single-sided printing, combining printing, margin size adjustment and the like), and generation processing of finishing information, which is a preview image of the finished state.

The image processing unit 13 includes a finishing-information generation unit 131, an input-screen information generation unit 132, and a setting unit 133.

The finishing-information generation unit 131 basically generates a finishing information (preview image) after processing of a document image to be displayed on a display panel 15b, which will be described later, and various setting processing according to setting processing based on various item inputs to the image data obtained by pre-scanning the document. The finishing information representing a result of processing and finishing to the document image is generated. The finishing-information generation unit 131 basically uses multiple-value data temporarily stored in the image memory unit 12.

The input-screen information generation unit 132 generates input screen information to be displayed on the display panel 15b including setting processing items to accept various setting inputs to the finishing information generated by the finishing-information generation unit 131.

The setting unit 133 receives an input signal when a user makes input for setting to an input screen 400 displayed on the display panel 15b from a touch panel 15a, which will be described later, and obtains coordinate information relating to the input image stored in the image memory unit 12.

When the setting unit 133 receives the setting input signal, the finishing-information generation unit 131 updates and generates the finishing information again according to the received setting input signal, and the display panel 15b displays an updated finishing forecast screen according to the updated and generated finishing information.

The input-screen information generation unit 132 generates input screen information that generates a screen to receive the setting input from the user again by the input signal received by the setting unit 133, and the display panel 15b updates and displays the input screen 400 by the generated input screen information.

The printer controller 142 receives a command of the system control unit 16 and controls the printer 14.

The printer 14, controlled by the printer controller 142, is a printer to carry out deflection and scanning of a light beam based on the image data processed by the image processing unit 13, development to an electrostatic latent image formed on photoreceptor using a toner, and transfer of the generated toner image to a transfer paper for fixing processing using an electrophotographic technology. As the printing method of the printer 14, various methods may be used such as inkjet, sublimation heat transfer, silver salt, direct thermal recording, melting heat transfer and the like other than the electrophotography system.

The printer 14 has the finishing processing unit 141. The finishing processing unit 141 receives automatic setting or setting by a user and handles finishing processing such as sorting that sorts the printed matter 20 given printing processing by the unit of copies or pages, stamping that gives a predetermined stamp according to a printing medium, stapling that aligns a plurality of sheets of printing medium and staples them, or punching for punching a hole to put the sheets of printing medium in a binder or a file.

The operation display control unit 151 functions as a display unit and upon receipt of a command of the system control unit 16, controls input/output of the operation display unit 15. For example, the operation display control unit 151 controls output of data processed by the image processing unit 13 to the touch panel 15a and the display panel 15b provided at the operation display unit 15. More specifically, the operation display control unit 151 displays the generated finishing information (preview image) on the display panel 15b. Also, the operation display control unit 151 controls input from the touch panel 15a. The display panel 15b and the touch panel 15a are illustrated separately on the screen, but they are constructed integrally here.

The touch panel 15a electrically or magnetically detects a position on the panel where the pointer touches. As a designating unit (not shown) for the touch panel 15a, a fingertip of a human, a stylus pen, and other contact input tool (hereinafter, referred to as the pointer) can be applied. That is, a user inputs various items including printing setting by touching the touch panel 15a with such the pointer.

In this embodiment, touch input to the touch panel 15a is described as an example; however, touch input is not necessarily the only embodiment of the present invention. For example, the operation display unit 15 may be provided with a hard key to accept physical holding-down of the key by an operator for input other than the touch panel 15a so that an instruction such as printing can be made. Also, the display panel 15b may use an exclusive display apparatus provided at the MFP 10.

The operation display unit 15, controlled by the operation display control unit 151, accepts input of setting contents through the touch panel 15a, and displays menu items of a setting screen for setting the finishing information (preview image) and screen finishing on the display panel 15b, which is a display unit.

The operation display unit 15 displays functions to be executed by the MFP 10 as the menu items of the setting screen and accepts setting inputs by a user from the displayed menu items. That is, in the operation display control unit 151, when the pointer touches the touch panel 15a at an area where an item can be selected, the coordinate of the pressed unit is detected, and when the touch on the selectable area is detected, the applicable item is accepted as selection. For example, the operation display unit 15 accepts setting of reading conditions in the scanner 11 according to the state of the document, setting in the image processing unit 13 that executes image quality control for the read-out image data, setting of printing conditions in the printer 14, setting of the finishing processing unit 141 for finishing processing such as sorting, stapling, punching and the like on completed printed matters and the like.

The system control unit 16 generates the finishing information (preview image) by reflecting the setting processing requested at the image processing unit 13 for the original image data stored in the image memory unit 12 and sends it to the operation display unit 15 for display, when the above various settings are accepted through the operation display control unit 151.

Figure 2:
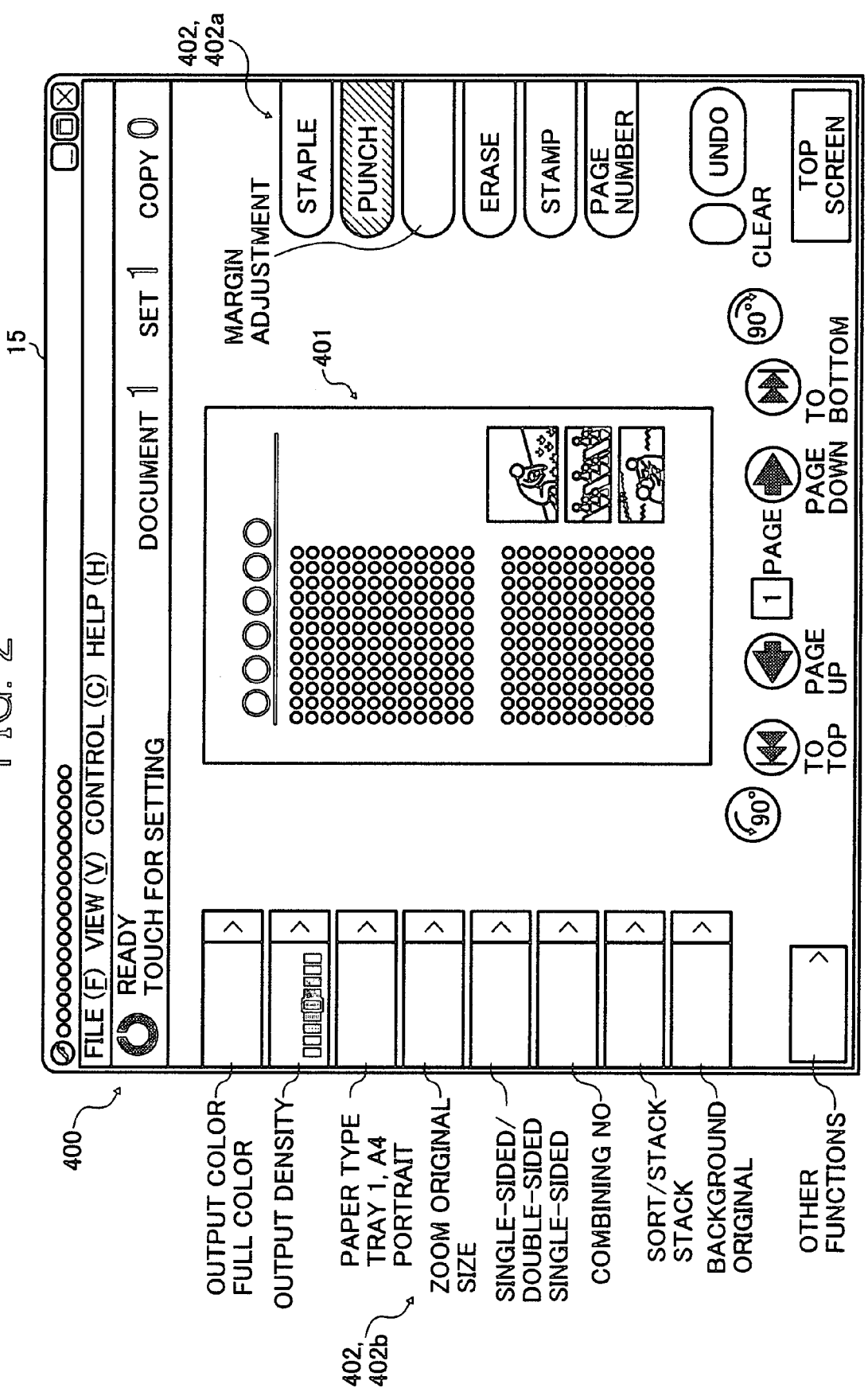
FIG. 2 is a schematic for explaining an example of finishing information (preview image) generated by the MFP shown in FIG. 1.

FIG. 2 is a schematic for explaining an example of the finishing information (preview image) generated by the MFP 10 from the image data. On the display panel 15b of the operation display unit 15, the finishing information (preview image) 401 and setting processing items 402 are displayed. As the setting processing items 402, menus 402a such as staple, punch, margin adjustment, erase, stamp, and page number depending on the location on the finishing information (preview image) 401 are displayed on the right side of the screen. Also, menus 402b not depending on the contents such as output color, output density, paper, zoom, single-sided/double-sided, combining, sort/stack and background are displayed on the left side of the screen.

When the operator touches with the pointer while looking at the finishing information (preview image) 401 displayed on the display panel 15b, the touch panel 15a accepts input of position information, which is spatial information in the finished state of a printed matter on the displayed finishing information (preview image) 401. In this case, the setting unit 133 analyzes the position information accepted by the touch panel 15a and obtains coordinate information on the screen touched by the pointer.

By this construction, the MFP 10 displays the finishing information (preview image) 401 on the display panel 15b provided at the operation display unit 15 of the MFP 10 prior to actual copy printing, changes setting if necessary after visual check of the finishing information (preview image), and can execute actual printing.

Figure 3:
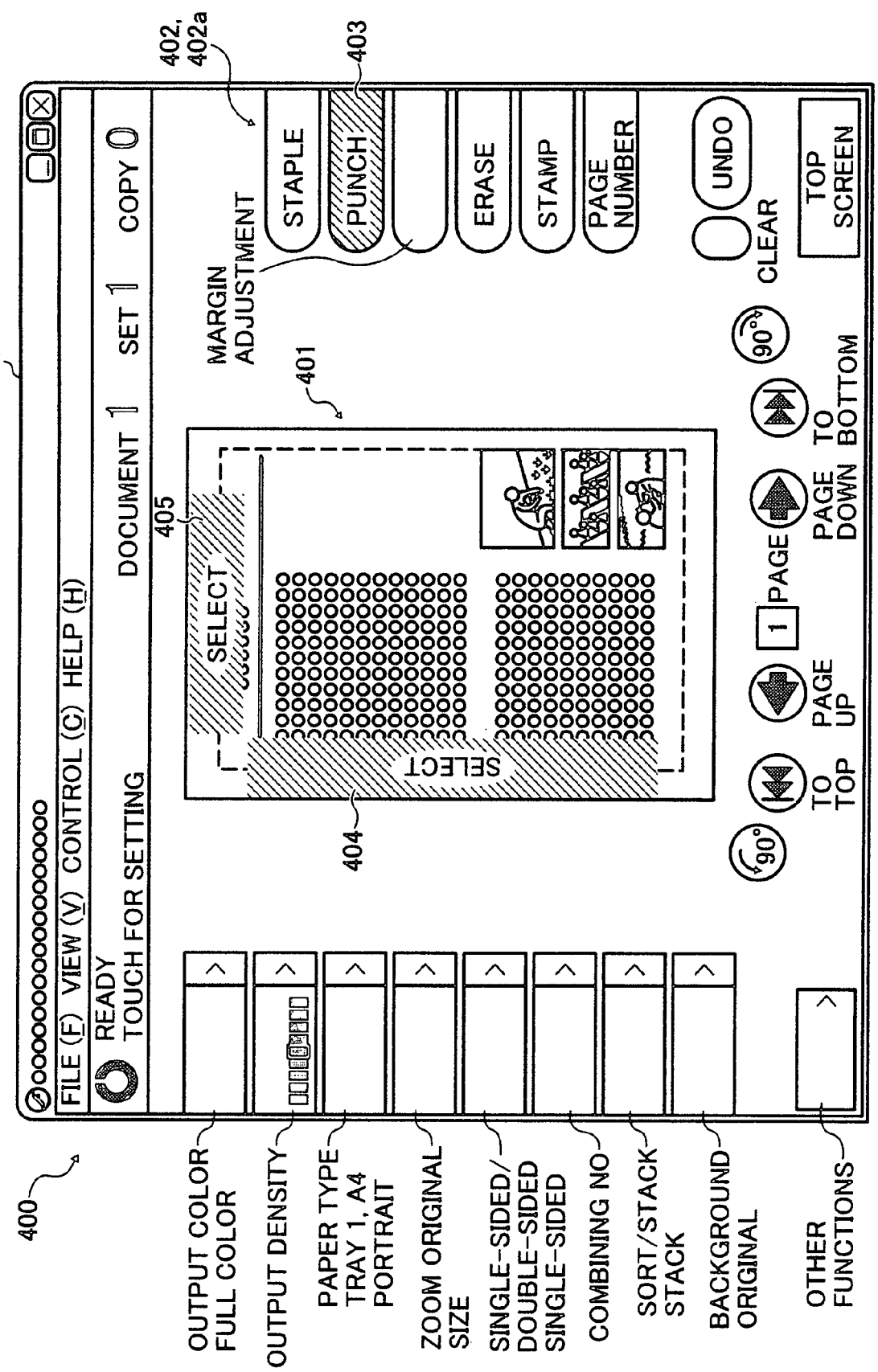
FIG. 3 is a schematic for explaining selection of a setting processing item.

Suppose, as shown in FIG. 3, that a punch 403 is selected by the touch input of an operator from the setting processing items 402 (402a) displayed in the operation display unit 15.

Figure 4:
FIG. 4 is an example of contents of a corresponding definition table.

When the operation display unit 15 detects the touch input from the punch 403 and the system control unit 16 accepts the setting of the punch 403 through the operation display control unit 151, the input-screen information generation unit 132 of the image processing unit 13 reads out a punch region which can be set in correspondence with the "punch" from the correspondence definition table between the processing items shown in FIG. 4 and the functions, and displays the functions 404 and 405 on the operation display unit 15. The form to display the functions 404 and 405 capable of being punched in the finishing information (preview image) 401 may be overlapped with each other or in the overwritten display form.

Alternately, an expression form such as change of color of the settable region, flashing or dark-out of the other regions may be also applied.

Figure 5:
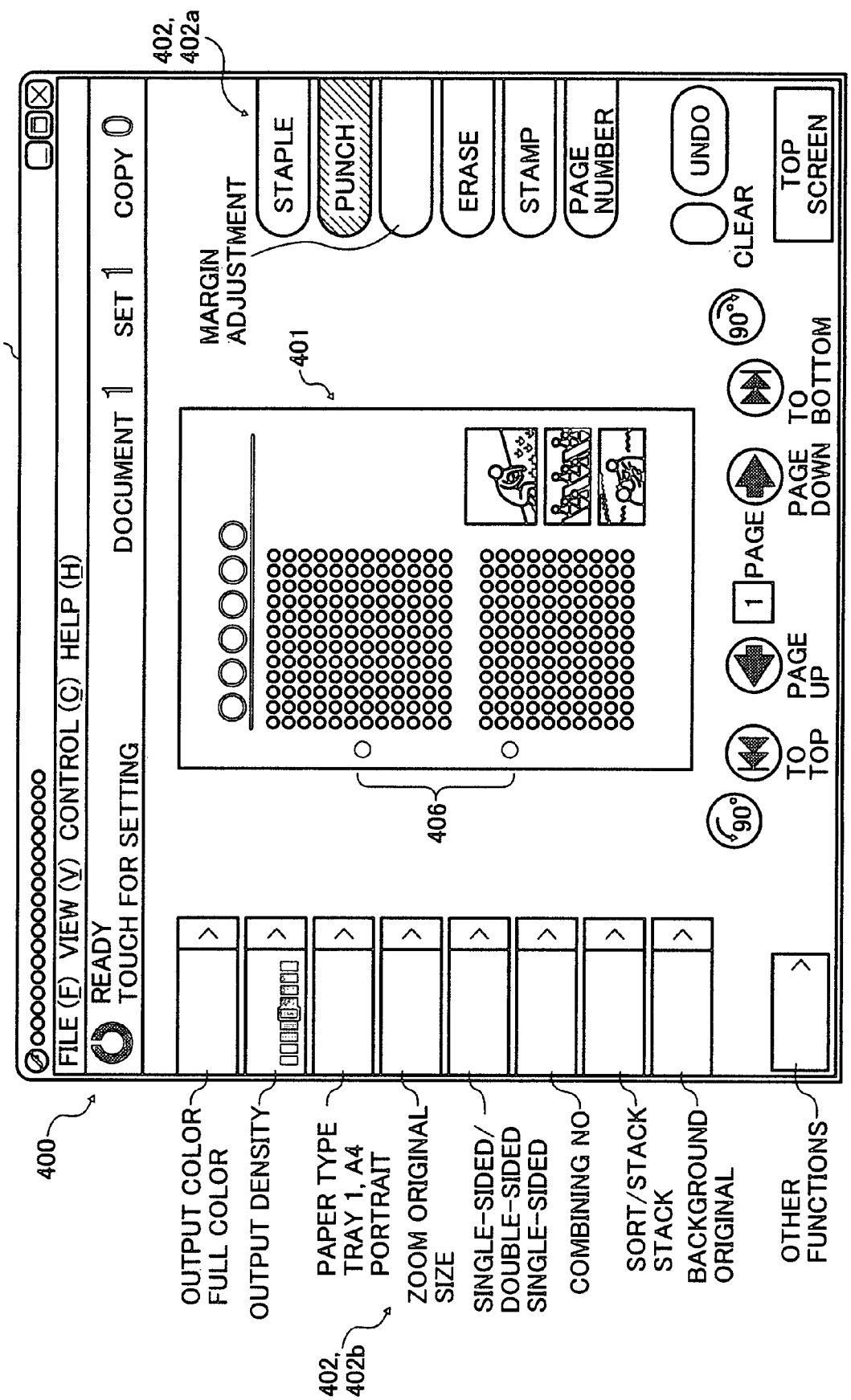
FIG. 5 depicts an example of finishing information (preview image)

The operator can input instructions by touching the punch-hole function 404 shown in FIG. 3. The operation display unit 15 accepts the touch input from the punch 403, and the finishing-information generation unit 131 of the image processing unit 13 generates the finishing information (preview image) reflecting the setting processing for punching processing in the accepted region and sends it to the operation display unit 15 for display. FIG. 5 shows the finishing information (preview image) 401 for which a punching processing 406 is executed. A setting input such as modification is accepted from the finishing information (preview image) 401 displayed in this way. The accepted setting is reflected again and displayed, while if it is not accepted, printing execution is accepted.

When various setting processing is made on the preview display of the operation display unit 15 of the MFP 10, the finishing information (preview image) 401 reflecting the setting is displayed on the display panel 15*b*, and printing is made after check of the finished state, but the following problem can occur when considering a processing load.

The first point is that processing can not be made unless the document is pre-scanned and image data is read out prior to actual copy printing. The second point is that the read-out image data in the finished state obtained by giving processing by various functions such as finishing to the pre-scanned document image should be converted to an image for display.

That is, it is preferable that the finished state is as close to the actual printed state as possible, but because the document is pre-scanned to generate a preview image, the setting made on this preview image is made on the original image data, and the finishing information (preview image) 401 is made from the processed image data and displayed, there is a problem that the processing load is large.

Then, in this embodiment, a sample image is displayed on the display panel 15*b* prior to the pre-scanning of the document, and various setting processing is made on this sample image. That is, in the various setting processing in the operation display unit 15, image data actually read out by the scanner 11, for example, is not used.

Figure 6:
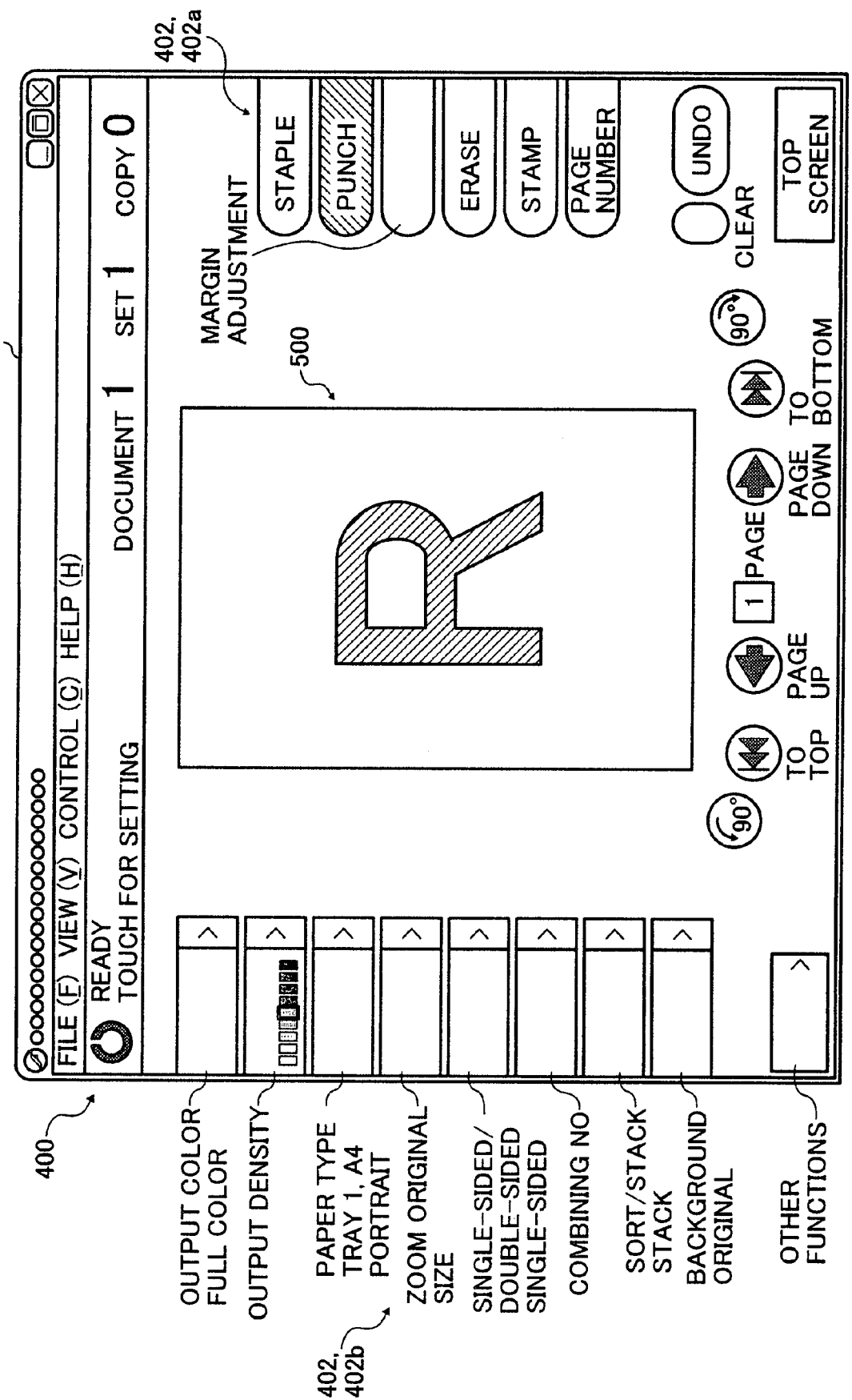
FIG. 6 is a schematic for explaining display of a sample image instead of read-out image data.

Specifically, as shown in FIG. 1, a sample image data 12*a* is stored in the image memory unit 12 in advance, and after start of the MFP 10, a sample image 500 and the setting processing items 402 are displayed on the display panel 15*b* of the operation display unit 15 as shown in FIG. 6.

Figure 7:
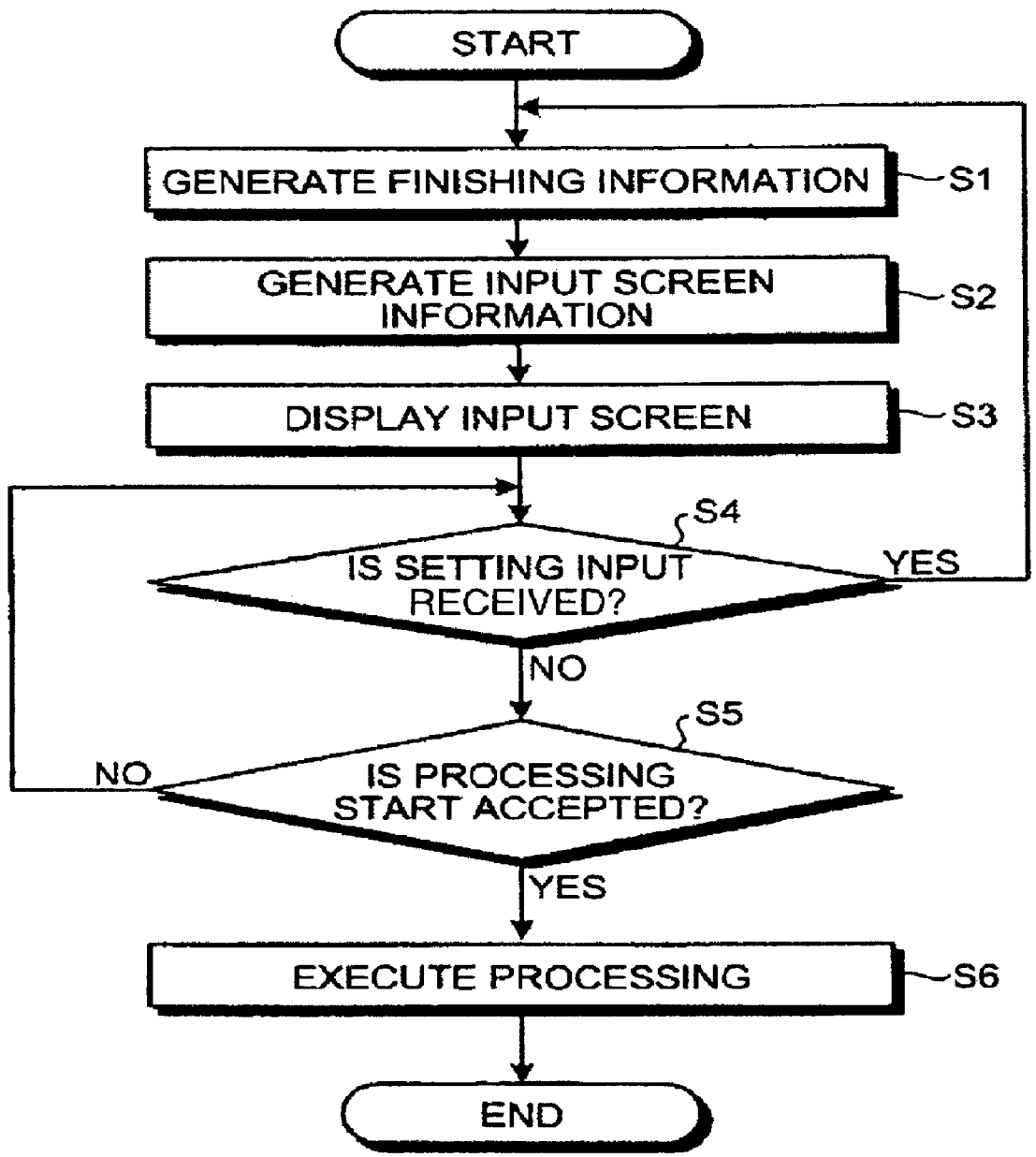
FIG. 7 is a flowchart of a process procedure performed by the MFP shown in FIG. 1.

FIG. 7 is a flowchart showing a flow from the setting processing to the copy processing by control of the system control unit 16 on each unit. As shown in FIG. 7, after start of the MFP 10, the finishing-information generation unit 131 first generates temporary finishing information representing a result of processing on the sample image data 12*a* and finishing processing based on the initial setting information (default setting item values) (Step S1). A temporary finishing-information generation unit is realized in this manner. The input-screen information generation unit 132 generates input screen information to accept setting inputs from a user according to the default setting (Step S2). Information of the default setting can be stored in the system control unit 16 as a default specification.

The display panel 15*b* displays the input screen 400 that accepts setting inputs according to the temporary finishing information generated by the finishing-information generation unit 131 and the input screen information generated by the input-screen information generation unit 132 (Step S3).

Figure 8:
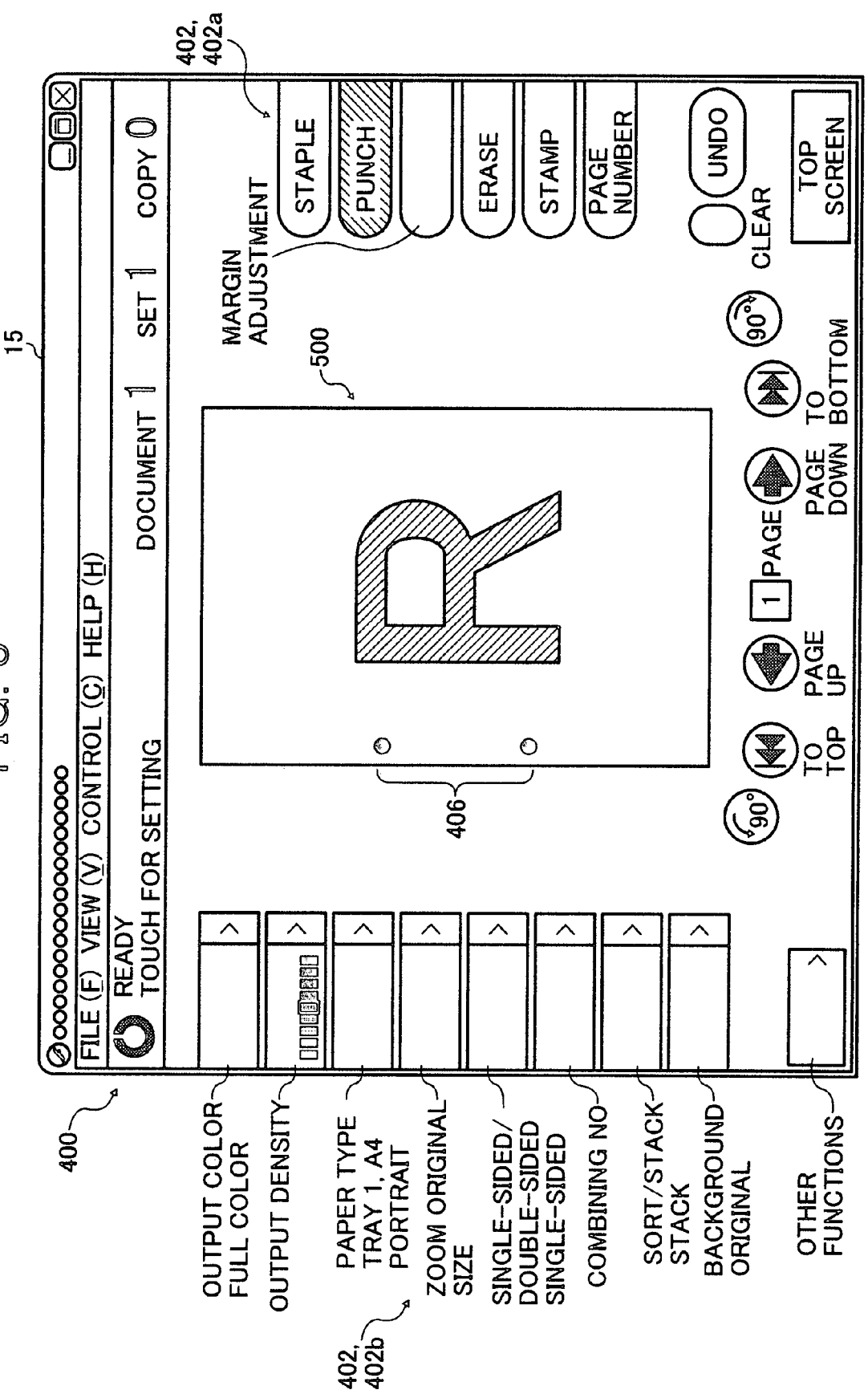
FIG. 8 is a schematic for explaining display of a sample image to which punching processing is carried out.

Here, the user executes setting input when necessary while looking at the displayed input screen 400. The setting unit 133 detects if a setting input is made by the user through the touch panel 15*a* (Step S4), and when acceptance of the setting input is detected (Yes at Step S4), the finishing-information generation unit 131 generates the temporary finishing information representing the result of processing on the sample image date 12*a* and finishing processing again based on the accepted setting information (Step S1). The temporary finishing-information generation unit is realized. The input-screen information generation unit 132 generates the input screen information to accept the setting input from the user according to the accepted setting information again (Step S2). When the menu contents is newly changed by setting from the user, the input screen information to display the new input screen 400 including the changed contents is generated. The display panel 15*b* displays the input screen 400 (See FIG. 8) to accept the setting input according to the temporary finishing information generated by the finishing-information generation unit 131 and the input screen information generated by the input-screen information generation unit 132 again (Step S3). FIG. 8 is a diagram showing the sample image 500 to which the punching processing 406 is executed.

The operation display unit 15 is generally in a state to detect a copy execution command made by pressing of a copy button or the like, and when a setting input has not been received (Step S4, NO) and a copy execution command is accepted (Yes at Step S5), copying of the read-out image data is executed based on the finishing information when setting processing is executed based on the various setting inputs to the sample image 500 (processing at Step S6 corresponds to the processing performed by the copying processing unit).

Accordingly, setting processing of various items is executed on the sample image 500 displayed as a top screen on the operation display unit 15 of the MFP 10, and the image reflecting the setting is displayed on the display panel 15*b* as the finishing information (preview image). By this, because there is no need to pre-scan the document, high-speed setting processing of various items can be promoted.

Next, a second embodiment of the present invention is explained below with reference to FIG. 9. The same units as those in the first embodiment are given the same reference numerals and the description will be omitted.

In the first embodiment, the sample image data 12*a* prepared in advance is displayed instead of the read-out image data to make various setting; however, in the second embodiment, the sample image data 12*a* is displayed instead of the read-out image data to make various setting and the finishing information (preview image) reflecting the setting contents in the read-out image data loaded after completion of setting is also generated for execution of processing after check.

Figure 9:
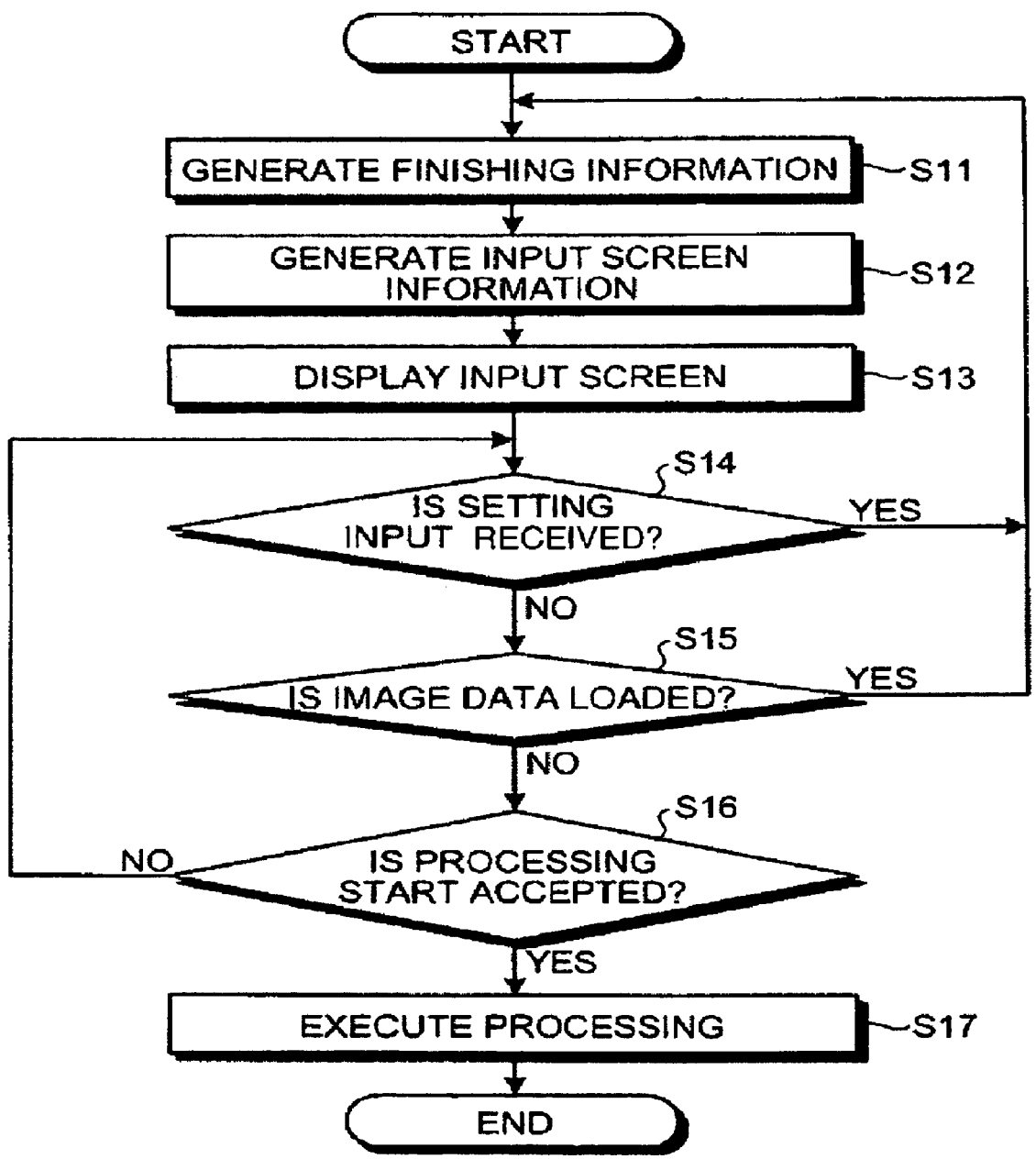
FIG. 9 is a flowchart of process procedure performed by control an MFP according to a second embodiment of the present invention.

FIG. 9 is a flowchart showing a flow from the setting processing to the copying processing by control of the system control unit 16 on each unit. As shown in FIG. 9, after start of the MFP 10, the finishing-information generation unit 131 first generates the temporary finishing information representing a result of processing on the sample image data 12*a* and finishing processing based on the initial setting information (default setting item values) (Step S11). The temporary finishing-information generation unit is realized in this manner. The input-screen information generation unit 132 generates the input screen information to accept setting inputs from a user according to the default setting (Step S12). The default setting information can be stored in the system, control unit 16 as the default specification.

The display panel 15*b* displays the input screen 400 to accept finishing forecast and setting inputs according to the temporary finishing information generated by the finishing-information generation unit 131 and the input screen information generated by the input-screen information generation unit 132 (Step S13).

The user makes setting inputs when necessary while looking at the displayed input screen 400. The setting unit 133 detects if a setting input is made from a user through the touch panel 15a (Step S14), and if acceptance of the setting input is detected (Yes at Step S14), the finishing-information generation unit 131 generates the temporary finishing information again representing a result of processing on the sample image data 12a and the finishing processing based on the accepted setting information (Step S11). The temporary finishing-information generation unit is realized. The input-screen information generation unit 132 generates again the input screen information to accept setting inputs from the user according to the accepted setting information (Step S12). When the menu contents are newly changed by setting from the user, the input screen information to display the new screen including the changed contents is generated. The display panel 15b displays again the input screen 400 (See FIG. 8) to accept the setting input according to the temporary finishing information generated by the finishing-information generation unit 131 and the input screen information generated by the input-screen information generation unit 132 (Step S13).

And if image data is loaded after completion of setting (No at step S14, and Yes at Step S15), the finishing information representing the result of processing on the read-out image data and the finishing processing is generated again based on the setting information on the sample image data 12a (Step S11). The finishing-information generation unit is realized. The input-screen information generation unit 132 generates again the input screen information to accept setting inputs from the user according to the accepted setting information (Step S12). When the menu contents are newly changed by the setting from the user, the input screen information to display the new screen including the changed contents is generated. The display panel 15b displays the input screen 400 (See FIG. 2) again to accept the setting input according to the finishing information generated by the finishing-information generation unit 131 and the input screen information generated by the input-screen information generation unit 132 (Step S13).

The operation display unit 15 is generally in a state to detect a copy execution command made by pressing of a copy button or the like, and when no image data is loaded after completion of setting (step S14, NO, and step S15, NO) and the copy execution command is accepted (Yes at Step S16), copying of the read-out image data is executed based on the finishing information when setting processing is executed based on the various setting inputs to the read-out image data (processing at Step S17 corresponds to the processing performed by the copying processing unit).

Accordingly, setting processing of various items is carried out on the sample image 500 displayed as the top screen on the operation display unit 15 of the MFP 10 and the image reflecting the setting is displayed on the display panel 15b as the temporary finishing information (preview image), the finishing information (preview image) reflecting the setting contents in the image data read after completion of the setting is created, and the processing is executed after the check. By this, because there is no need to pre-scan the document in the first setting processing, high-speed setting processing of various items can be promoted.

Next, a third embodiment of the present invention is explained below with reference to FIG. 10. The same parts as those in the above first embodiment are given the same reference numerals and the description will be omitted.

In the first embodiment, the sample image data 12a prepared in advance is displayed instead of the read-out image data to make various settings; however, in the third embodiment, the sample image data 12a is displayed instead of the read-out image data to make various settings till the read-out image data becomes displayable and the finishing information (preview image) reflecting the setting contents in the image data read out after completion of setting is also generated for execution of processing after check.

Figure 10:
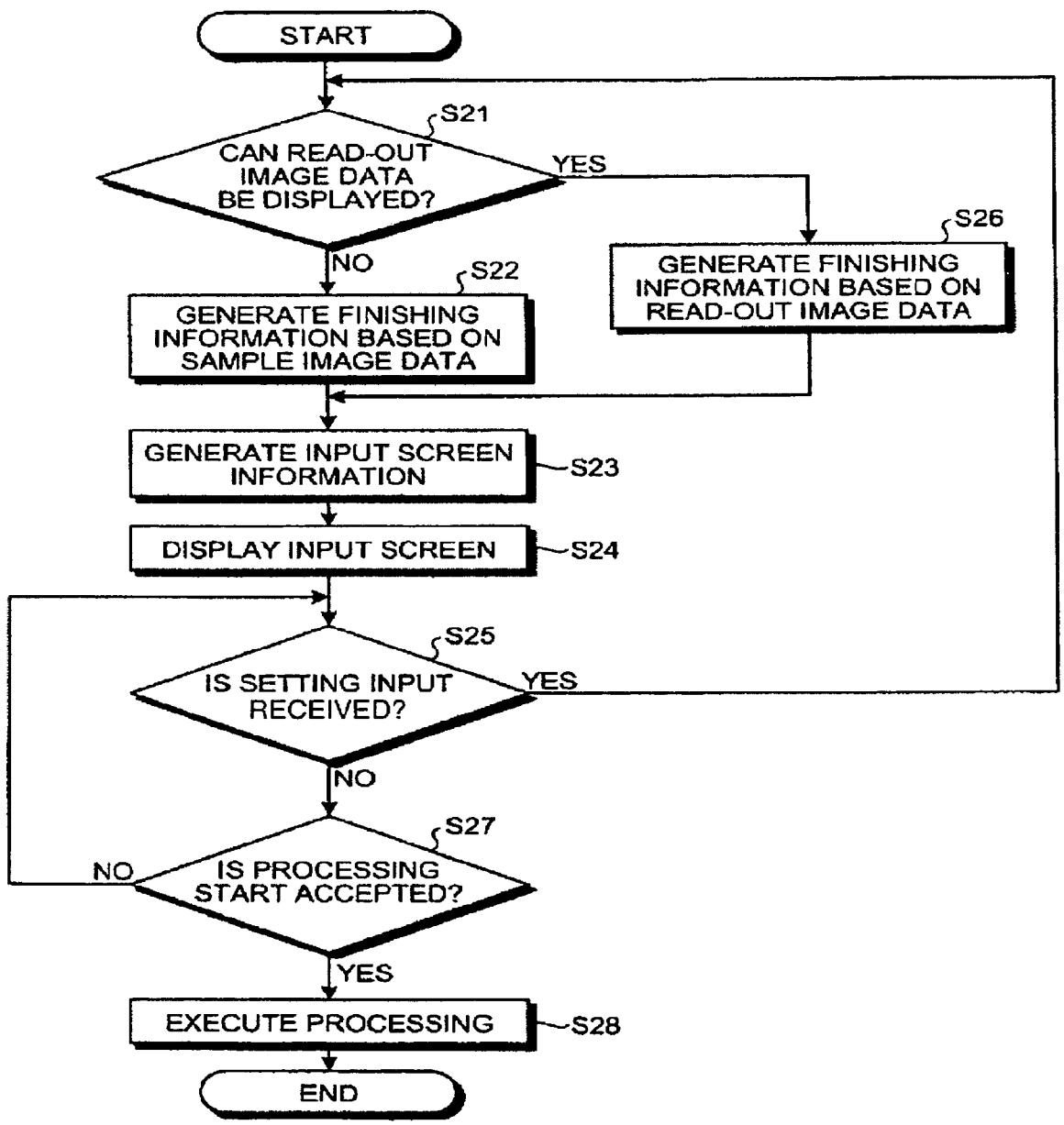
FIG. 10 is a flowchart s of process procedure performed by an MFP according to a third embodiment of the present invention.

FIG. 10 is a flowchart showing a flow from the setting processing to the copying processing by control of the system control unit 16 on each unit. As shown in FIG. 10, if the read-out image data can not be displayed (No at Step S21), the finishing-information generation unit 131 first generates the temporary finishing information representing a result of processing on the sample image data 12a and the finishing processing based on the initial setting information (default setting item values) (Step S22). Here, the temporary finishing-information generation unit is realized. And the input-screen information generation unit 132 generates the input screen information to accept setting inputs from the user according to the default setting (Step S23). The information of the default setting can be stored in the system control unit 16 as the default specification.

The display panel 15b displays the input screen 400 to accept the setting inputs according to the temporary finishing information generated by the finishing-information generation unit 131 and the input screen information generated by the input-screen information generation unit 132 (Step S24).

The user inputs setting when necessary while looking at the displayed input screen 400. The setting unit 133 detects whether a setting input is made from the user through the touch panel 15a (Step S25), and if acceptance of a setting input is detected (Yes at Step S25) and if the read-out image data is not displayable (No at Step S21), the finishing-information generation unit 131 generates the temporary finishing information again representing a result of processing on the sample image data 12a and the finishing processing based on the accepted setting information (Step S22). Here, the temporary finishing-information generation unit is realized. The input-screen information generation unit 132 generates again the input screen information to accept the setting inputs from the user according to the accepted setting information (Step S23). When the menu contents are newly changed by setting from the user, the input screen information to display the new screen including the changed contents is generated. The display panel 15b displays again the input screen 400 (See FIG. 8) to accept the setting input according to the temporary finishing information generated by the finishing-information generation unit 131 and the input screen information generated by the input-screen information generation unit 132 (Step S24).

On the other hand, if acceptance of the setting input is detected (Yes at Step S25) and the read-out image data can be displayed (Yes at Step S21), the finishing information representing a result of processing on the read-out image data and finishing processing is generated based on the setting information on the sample image data 12a (Step S26). The finishing-information generation unit is realized. The input-screen information generation unit 132 generates the input screen information to accept the setting input from the user according to the accepted setting information (Step S23). When the menu contents are newly changed by setting from the user, the input screen information to display the new screen including the changed contents is generated. The display panel 15b displays the input screen 400 (See FIG. 2) to accept the setting input according to the finishing information generated by the finishing-information generation unit 131 and the input screen information generated by the input-screen information generation unit 132 (Step S24).

The operation display unit 15 is generally in a state to detect a copy execution command made by pressing of a copy button or the like, and when a setting input has not been received (Step S25, NO) and a copy execution command is accepted (Yes at Step S27), copying is executed based on the finishing information when setting processing is executed (processing at Step S28 corresponds to the processing performed by the copying processing unit).

Accordingly, setting processing of various items is carried out on the sample image 500 displayed as the top screen on the operation display unit 15 of the MFP 10 and the image reflecting the setting is displayed on the display panel 15b as the temporary finishing information (preview image), the finishing information (preview image) reflecting the setting contents in the read-out image data is created when the read-out image data becomes displayable, and the processing is executed after the check. By this, because there is no need to pre-scan the document in the first setting processing, high-speed setting processing of various items can be promoted.

In each of the embodiments, the sample image data 12a is stored in advance in the image memory unit 12, and various settings are made by displaying the sample image data 12a instead of the read-out image data, but not limited to this, the image data read out by document scanning is stored in the image memory unit 12 at the previous operation and the read-out image data may be displayed instead of the pre-scanned read-out image data for making various settings. By this, there is no need to prepare sample image data in advance.

In each of the embodiment, single sample image data 12a is stored in advance in the image memory unit 12, and the sample image data 12a is displayed instead of the read-out image data for making various settings, but not limited to this, appropriate data may be made selectable from a plurality of sample image data prepared in advance according to image characteristic values of read-out image data on which copying processing is executed (only characters, characters+photos, photos, 2-in-1 and the like) so that the sample image data according to the document characteristic value of the document for which the selected copying processing is executed is displayed instead of the read-out image data to make various settings. By this, more detailed setting can be made.

Further effects and variations can be easily derived by those skilled in the art. Thus, a wider variety of modes of the present invention are not limited by the above depicted and described specific details and representative embodiment. Therefore, various changes can be made without departing from the spirit or scope of the comprehensive concept of the invention defined by the appended claims and their equivalents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    an input unit that receives input of real image data;
    a storage unit that stores therein sample image data in advance;
    a first generation unit that generates temporary finishing information by executing various setting processing on the sample image data in the storage unit prior to the input unit receiving the real image;
    a second generation unit that generates input screen information including setting processing items to accept various setting inputs to the temporary finishing information;
    a display unit that displays an input screen showing a preview of finishing corresponding to the various setting processing as applied to the sample image based on the temporary finishing information and the input screen information;
    a setting output unit that receives the setting information received via the input screen and outputs the received setting information to the first generation unit;
    a third generation unit that generates finishing information reflecting the various settings made on the sample image data as applied to the real image data after completion of the various settings to the sample image data; and
    a copying processing unit that executes copying in processing with resect to the real image data to thereby produce printed matter and receives the printed matter and applies post-printing finishing processing thereto based on the finishing information,
    wherein the storage unit stores therein a plurality of different sample image data, and the first generation unit selects an appropriate sample image data from among the sample data in the storage unit depending on image characteristics of the real image data.

2. The image forming apparatus of claim 1 in which said post-printing finishing processing comprises at least one of sorting, stamping, stapling and hole-punching.

3. The image forming apparatus of claim 1, wherein the display unit displays the finishing information as applied to the real image data generated by the third generation unit before copying processing is executed and only after completion of accepting setting inputs to the temporary finishing information.

4. The image forming apparatus of claim 1, wherein the second generation unit generates second input screen information including setting processing items to accept various setting inputs to the finishing information and
    before copying processing is executed, the display unit displays a second input screen showing a preview of finishing corresponding to the various setting processing as applied to the real image based on the finishing information from the third generation unit and the second input screen information from the second generation unit.

5. An image forming apparatus comprising:
    an input unit that receives input of real image data;
    a storage unit that stores therein sample image data in advance;
    a first generation unit that generates temporary finishing information by executing various setting processing on the sample image data in the storage unit prior to the input unit receiving the real image;
    a second generation unit that generates input screen information including setting processing items to accept various setting inputs to the temporary finishing information;
    a display unit that displays an input preview of finishing corresponding to the various setting processing as applied to the sample image based on the temporary finishing information and the input screen information;
    a setting output unit that receives the setting information received via the input screen and outputs the received setting information to the first generation unit;

a third generation unit that generates finishing information reflecting the various settings made on the sample image data as applied to the real image data after completion of the various settings to the sample image data; and a copying processing unit that executes copying processing with respect to the real image data to thereby produce printed matter and receives the printed matter and applies post-printing finishing processing thereto based on the finishing information, wherein real image data received by the input unit at a previous operation is stored in the storage unit as the sample image data.

6. The image forming apparatus of claim 5 in which said post-printing finishing processing comprises at least one of sorting, stamping, stapling and hole-punching.

7. The image forming apparatus of claim 5, wherein the input unit does not receive the real image data until after completion of accepting setting inputs to the temporary finishing information.

8. The image forming apparatus of claim 5, wherein the second generation unit generates input screen information including setting processing items to accept various setting inputs to the finishing information data after the completion of the various settings to the sample image data.

9. An image forming apparatus comprising:
   an input unit that receives input of real image data;
   a storage unit that stores therein sample image data;
   a first generation unit that generates temporary finishing information by making various setting processing on the sample image data till the real image data becomes displayable;
   a second generation unit that generates input screen information including setting processing items to accept various setting inputs to the temporary finishing information;
   a display unit that displays an input screen showing a preview of finishing corresponding to the various setting processing as applied to the sample image based on the temporary finishing information and the input screen information;
   a setting output unit that receives the setting information received via the input screen and outputs the received setting information to the first generation unit;
   a third generation unit that generates finishing information reflecting various settings made on the sample image data as applied to the real image data when the real image data becomes displayable; and
   a copying processing unit that executes copying processing with respect to the real image data to thereby produce printed matter and applies post-printing finishing processing thereto based on the finishing information.

10. The image forming apparatus according to claim 9, wherein the storage unit stores therein a plurality of different sample image data, and the first generation unit selects an appropriate sample image data from among the sample data in the storage unit depending on image characteristics of the real image data.

11. The image forming apparatus according to claim 9, wherein real image data received by the input unit at a previous operation is stored in the storage unit as the sample image data.

12. The image forming apparatus according to claim 9, wherein the preview of the finishing corresponding to the various setting processing as applied to the sample image based on the temporary finishing information and the input screen information is displayed on said display unit before the real image is received.

13. The image forming apparatus of claim 12 in which said post-printing finishing processing comprises at least one of sorting, stamping, stapling and hole-punching.

14. The image forming apparatus of claim 9, wherein the second generation unit generates second input screen information including setting processing items to accept various setting inputs to the finishing information,
   the first generation unit determines, before generating temporary finishing information, whether the real image data is displayable and
   if the first generation unit determines that the real image data is displayable, the display unit displays a second input screen showing a preview of finishing corresponding to the various settings as applied to the real image based on the finishing information from the third generation unit and the second input screen information from the second generation unit.

15. The image forming apparatus of claim 9, wherein the second generation unit generates input screen information including setting processing items to accept various setting inputs to the finishing information when the real image data becomes displayable.

* * * * *